United States Patent
Antraygue

(10) Patent No.: US 11,645,938 B2
(45) Date of Patent: May 9, 2023

(54) COCKPIT CONTROLS SIMULATION

(71) Applicant: RATIER-FIGEAC SAS, Figeac (FR)

(72) Inventor: Cedric Antraygue, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 122 days.

(21) Appl. No.: 16/716,565

(22) Filed: Dec. 17, 2019

(65) Prior Publication Data

US 2020/0365050 A1  Nov. 19, 2020

(30) Foreign Application Priority Data

May 13, 2019 (EP) .................................. 19305612

(51) Int. Cl.

| | | |
|---|---|---|
| *G09B 9/28* | (2006.01) | |
| *B64C 13/04* | (2006.01) | |
| *G06F 3/01* | (2006.01) | |
| *G09B 9/10* | (2006.01) | |
| *G09B 9/16* | (2006.01) | |
| *G09B 9/30* | (2006.01) | |

(52) U.S. Cl.
CPC ............ *G09B 9/28* (2013.01); *B64C 13/0421* (2018.01); *G06F 3/016* (2013.01); *G09B 9/10* (2013.01); *G09B 9/165* (2013.01); *G09B 9/307* (2013.01)

(58) Field of Classification Search
CPC . G09B 9/28; G09B 9/10; G09B 9/165; G09B 9/307; B64C 13/0421; G06F 3/016
See application file for complete search history.

(56) References Cited

U.S. PATENT DOCUMENTS

| | | | | |
|---|---|---|---|---|
| 3,726,497 A | * | 4/1973 | Gannett | B64C 13/12 244/234 |
| 3,903,614 A | * | 9/1975 | Diamond | G09B 9/28 434/45 |
| 4,069,720 A | * | 1/1978 | Thor | G05G 9/04 74/471 R |
| 4,398,889 A | * | 8/1983 | Lam | G09B 9/28 434/45 |
| 4,568,286 A | * | 2/1986 | Acklam | G09B 9/28 434/45 |
| 4,632,341 A | * | 12/1986 | Repperger | B64C 13/0421 244/230 |
| 4,708,656 A | * | 11/1987 | de Vries | G09B 9/28 434/45 |
| 4,758,164 A | * | 7/1988 | de Vries | G09B 9/28 434/45 |
| 4,907,970 A | * | 3/1990 | Meenen, Jr. | G09B 9/28 244/223 |

(Continued)

OTHER PUBLICATIONS

"Control loading system" Wikipedia, obtained Sep. 20, 2019, 2 pages.
Extended European Search Report issued in Application No. 19305612 dated Oct. 10, 2019, 20 pages.

(Continued)

*Primary Examiner* — Xuan M Thai
*Assistant Examiner* — Sadaruz Zaman
(74) *Attorney, Agent, or Firm* — Cantor Colburn LLP

(57) ABSTRACT

A method and system for simulating pilot controls in a cockpit simulator by controlling one or more arms on which is/are mounted a control grip, pedal or the like, to locate the grip at different positions and allow movement of the grip in a plurality of movement directions and trajectories while allowing varying force feedback.

10 Claims, 3 Drawing Sheets

(56) References Cited

U.S. PATENT DOCUMENTS

| | | | | |
|---|---|---|---|---|
| 5,209,661 | A * | 5/1993 | Hildreth | G09B 9/28 |
| | | | | 434/45 |
| 5,431,569 | A * | 7/1995 | Simpkins | G09B 9/02 |
| | | | | 434/29 |
| 5,803,738 | A * | 9/1998 | Latham | B25J 9/1656 |
| | | | | 345/157 |
| 10,395,551 | B2 * | 8/2019 | Lechner | G09B 9/085 |
| 10,940,957 | B2 * | 3/2021 | Grohmann | B64D 45/00 |
| 2002/0055086 | A1 * | 5/2002 | Hodgetts | G09B 9/12 |
| | | | | 434/37 |
| 2019/0244537 | A1 * | 8/2019 | Liberatore | G06F 3/0205 |
| 2020/0055588 | A1 * | 2/2020 | Ezran | B64C 13/46 |
| 2020/0365050 | A1 * | 11/2020 | Antraygue | B64C 13/0421 |

OTHER PUBLICATIONS

Hongbin Gu et al., "Development of a Novel Low-Cost Flight Simulator for Pilot Training" World Academy of Sci., Eng. and Tech., International Jml of Mechanical, Aerospace, Industrial, Mechatronic and Manufacturing Engineering, vol. 3, No. 12, 2009.
Zheng Shutao et al., "Experiment and Study of Control Loading System in a Flight Simulator Based on RCP", Proceedings of the 2007 IEEE, International Conference on Integration Technology, Mar. 20-24, 2007, Shenzhen, China, 5 pages.
BMV: "The BMW X513 Owner's Manual", Jan. 1, 2016 (Jan. 1, 2016), XP055666949, Retrieved from the Internet: URL:http://cdn.dealereprocess.com/cdn/servicemanuals/bmw/2016-x5.pdf [retrieved on Feb. 10, 2020], 275 pages.
EPO Official Letter, for Application No. 19305612.4, dated Nov. 22, 2021.

* cited by examiner

COCKPIT CONTROLS SIMULATION

CROSS-REFERENCE TO RELATED APPLICATIONS

This application claims priority to European Patent Application No. 19305612.4 filed May 13, 2019, the entire contents of which is incorporated herein by reference.

TECHNICAL FIELD

The present disclosure is concerned with simulating pilot controls in an aircraft specifically, but not exclusively, in the development of a cockpit layout.

BACKGROUND

Pilot controls are used in a flight deck or cockpit of an aircraft to control different flight surfaces or control parameters such as power/thrust, braking etc. Pilots control flight using combinations of levers, handles, joysticks, switch, buttons, wheels, pedals. For example, a side stick is generally used for right/left/forward/backward movement by the pilot to command moveable surfaces of the aircraft for controlling the pitch and roll axes. The engine power or thrust might be controlled by levers moved forwards/backwards or operation of a so-called thrust assy.

Cockpit layouts will be designed to be simple and safe to operate and consideration, when designing cockpits, will be given to a number of factors including space and weight-saving, ergonomics, familiarity to pilots, ease of access and operation, the feel of the controls to the pilot, and the like. Many configurations and ergonomics are possible. Variables include the type of motion of the controls—e.g. linear or rotary; whether lever arms for rotation should be short pole or long pole, the direction and degree of travel of the control, the relative position of any grips or handles relative to the pilot and/or relative to the rest of the lever or other control member, e.g. should the grip be central, lateral etc., and also characteristics of force feel, force versus position and force versus speed.

During development of the aircraft, the layout of the cockpit and the pilot controls is defined in the early stages of the project.

Traditionally, the preferred layout is arrived at using an iterative process whereby a mock-up or prototype of the cockpit and each control is made and evaluated in a pilot simulation. Based on pilot feedback, iterations will be made until a preferred form for each control is arrived at. In the first mock-up, which will be very simple, the preferred shape of the control member and its direction and degree of travel will be determined on an iterative basis. This might require 3 or four (or even more) mock-ups until the best designed is found. The iteration needs to be carried out separately for each aspect of the design—e.g. first to identify the best type of motion for a given control and then to identify the best position, then the best grip shape etc. Each mock-up requires time to make, based on the feedback from the previous mock-up and so the whole process is very time intensive and costly. A cockpit design can take six to 12 months. Because of the time involved, a controls design team will usually start from a design they think will be close to the preferred option, rather than starting from scratch each time. Because of the desire to include as few iterations as possible, sometimes a team might settle for 'good enough' rather than 'ideal'.

There is a need for a less time- and cost-intensive system for designing pilot controls and cockpit layout.

SUMMARY

According to one aspect, the present disclosure provides a system for simulating pilot controls, comprising one or more computer controlled arms, arranged to be mounted in a cockpit environment and having a plurality of ranges of motion and trajectories and configured to receive a control member for operation by a pilot.

According to another aspect, there is provided a method of designing pilot controls in cockpit, the method comprising controlling one or more arms, on which is/are mounted a control member, to locate the control member at different positions and allow movement of the control member in a plurality of movement directions and trajectories.

The different movements preferably allow the possibility of different force feedback. The pilot can, from the force feedback, determine the optimal positions for control members such as levers, handles or pedals.

Preferably, a computer is provided to send commands to the arms to control the position and/or movement of the arms.

Preferably, feedback may be provided from the position and/or movement of the arms to a flight simulator display which can be e.g. a screen or a virtual reality headset.

The system is preferably mounted in a cockpit simulator having a pilot seat relative to which the arms are positioned. The arms are mounted at an appropriate location in the simulator e.g. in front of the pilot seat, or behind, above or below the seat. The arms must be mounted such that the grips when mounted on the arms can be moved to a location to be held and controlled by a pilot sitting in the seat.

The control computer can be mounted inside the cockpit simulator or outside for operation by a tester based on feedback from the pilot.

BRIEF DESCRIPTION OF THE DRAWINGS

Preferred embodiments will now be described by way of example only and with reference to the drawings.

DETAILED DESCRIPTION

Figure 1:
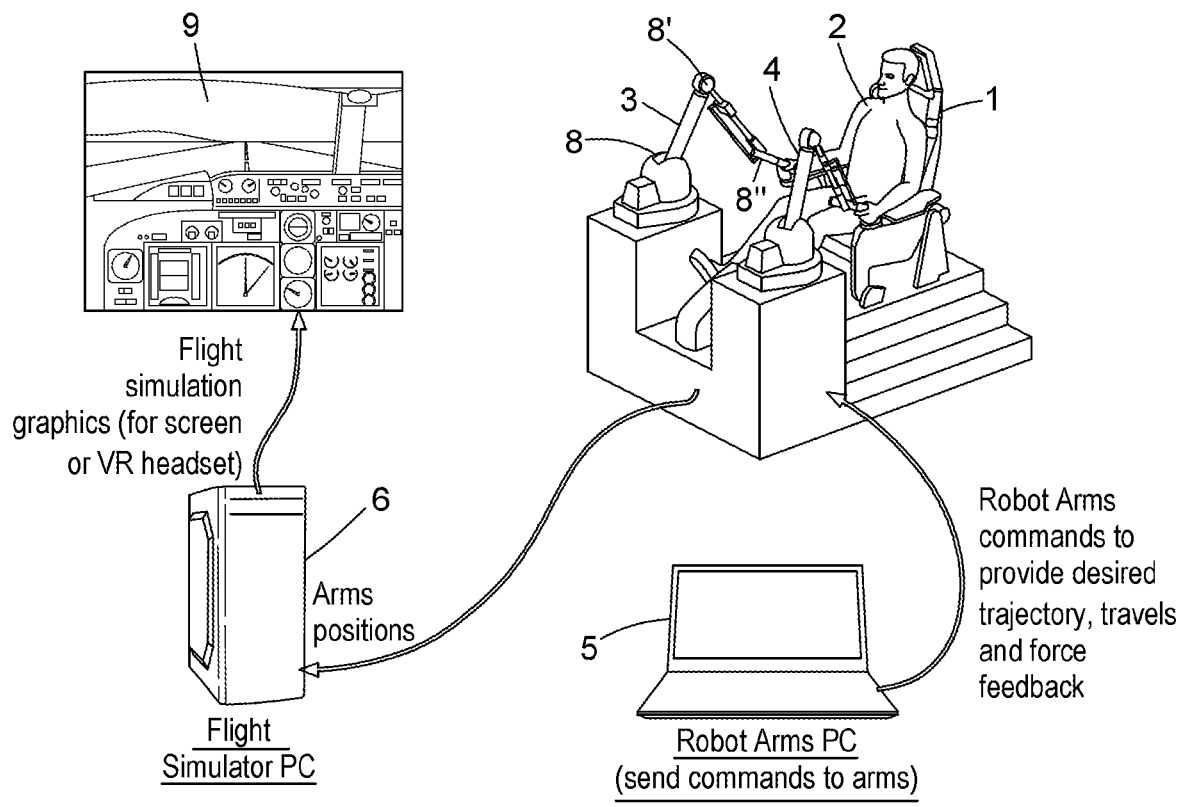
FIG. 1 is a schematic view of a simulator system for designing pilot controls according to the disclosure.

Pilots controls are designed in a simulated cockpit, similar to those know for flight simulation in e.g. pilot training. A pilot seat 1 is provided to simulated where and how a pilot 2 would be seated in the cockpit of an aircraft.

To design the best possible arrangement for the various flight controls, the system of the present disclosure includes one or more computer-controlled robotic or haptic arms (here, two arms 3,4 are shown but a single arm could be used or more than two.) The arms 3,4 will be described in more detail below, but these will have a range of movement and trajectories and will be mounted in the simulator cockpit at an appropriate location so that control members such as grips provided on the arms can be brought into reach of the pilot 2. In the embodiment shown, the arms are mounted in front of the pilot and extend towards the pilot. In other embodiments, the arms could be mounted and extend from behind, below or above the pilot. In some cases, it may be preferred that the arms are not in front of the pilot as the fact that s/he can see the arms might affect their perception of the controls during testing.

A computer 5 is provided to send commands to the arms to command the desired trajectory, travels, position and other parameters such as force, vibration or other factors that simulate the real 'feel' of pilot controls during flight. This means that the arms can be quickly and easily repositioned, have their travel or trajectory altered etc. until the preferred control member is found, rather than having to repeatedly make a new mock-up for testing by the pilot. The controls layout and configuration can then be set in a single sitting.

Preferably, the simulator cockpit is connected to a flight simulator computer 6 to convert the positions of the arms to flight simulation graphics on a screen 9 in front of the pilot and/or to a virtual reality (VR) headset worn by the pilot.

In some embodiments, computer 5 and computer 6 can be the same computer.

Grips 7 are mounted on the arms to simulate the part of the control that the pilot would hold. The grips are formed in the shape intended for the actual pilot controls. In the embodiment shown, grips for operation by the pilots hands are shown. The arms can also be provided with other control members such as pedals for operation by the pilot's foot, eg for braking, rudder control, etc. Preferably, these can be easily exchanged for grips of different shapes or sizes. In a preferred embodiment, these are made using 3D printing or additive manufacturing so that different shapes can be quickly provided during simulation and based on pilot feedback to determine the preferred shape for the final design.

The robotic arms 3,4 are hinged and articulated at various locations 8, 8', 8" to enable them to position the grips 7 relative to the pilot and to preform different types of movement (e.g. linear, rotary) and travel and trajectory under the control of the computer 5.

The pilot, in the simulation, can then grasp the grips 7 or place a foot on the pedal and, based on the setting for the arms from the computer 5, the pilot will experience the kinematics and ergonomics—i.e. type of movement, length of linear travel or radius of rotation etc. of the pilot control for those settings. In preferred embodiments, the arms 3,4 can also be programmed to reproduce the intended force feel e.g. the force versus position, force versus speed etc. when the pilot operates the grip 7. Based on feedback from the pilot for those settings the parameters are adjusted and the pilot then experiences the feel of the controls at the new settings, and so on until the ideal arrangement is found.

Because the robotic arms have a wide range of possible movement, a wide range of ergonomics can be quickly evaluated. For example, the pilot can test a side stick control having two axis of movement such as for controlling pitch and roll of the aircraft, or having three axes of movement such as for controlling pitch, roll and twist, or with four axes for testing control of up/down, pitch, roll and twist.

Figure 2:
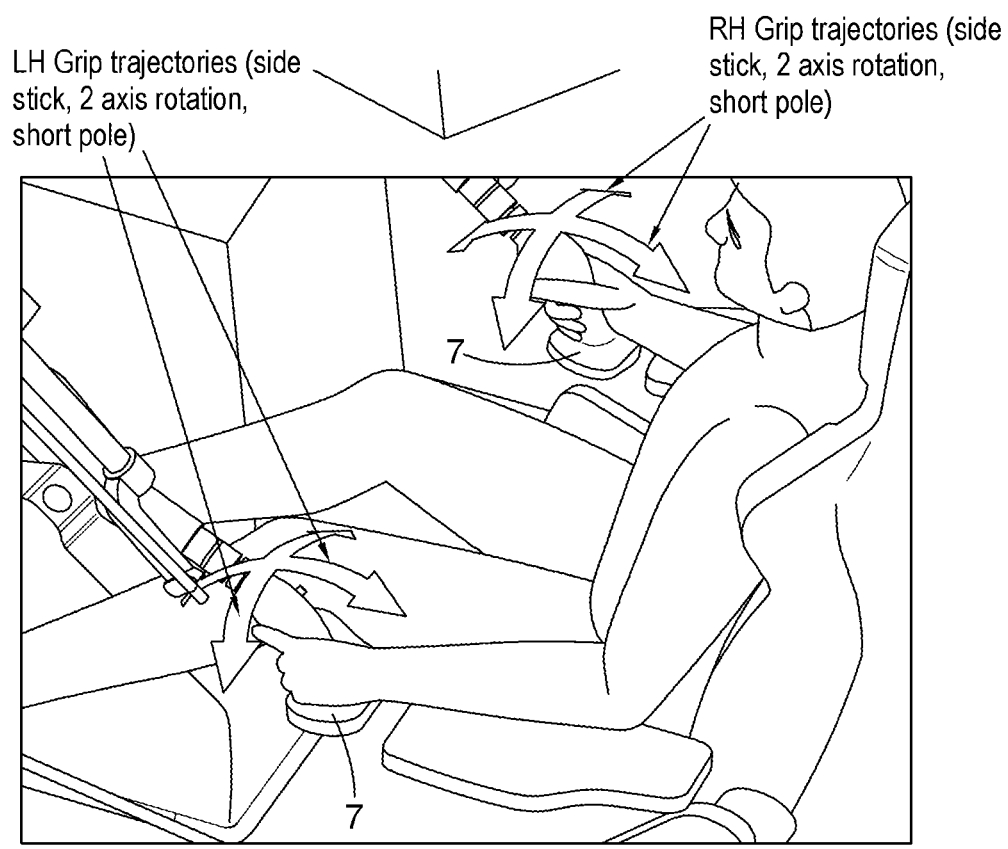
FIG. 2 shows the system of FIG. 1 in use for simulating one possible pilot controls layout.

FIG. 2, for example, shows the arms 3,4 arranged for the pilot to test two side sticks—i.e. two control sticks each located at a side of the pilot 2. The computer sets parameters for the arms in terms of where the grips 7 are located relative to the pilot 2, the trajectories—shown by the arrows in FIG. 2—and whether the controls are long or short pole. The grip shape and size is selected for a first test based on experience. The pilot then operates the controls preferably observing the flight simulator graphics on a screen in front of him or through a virtual reality headset and provides feedback as to his perception of the controls with those settings and parameters. Based on the pilot's feedback—e.g. grips to low, trajectory too long, force feedback too low, etc. new settings will be programmed at the computer 5 and the arms 3,4 will take up those settings. The pilot will then operate the controls with the new settings and so on until the pilot finds the right ergonomics.

Figure 3:
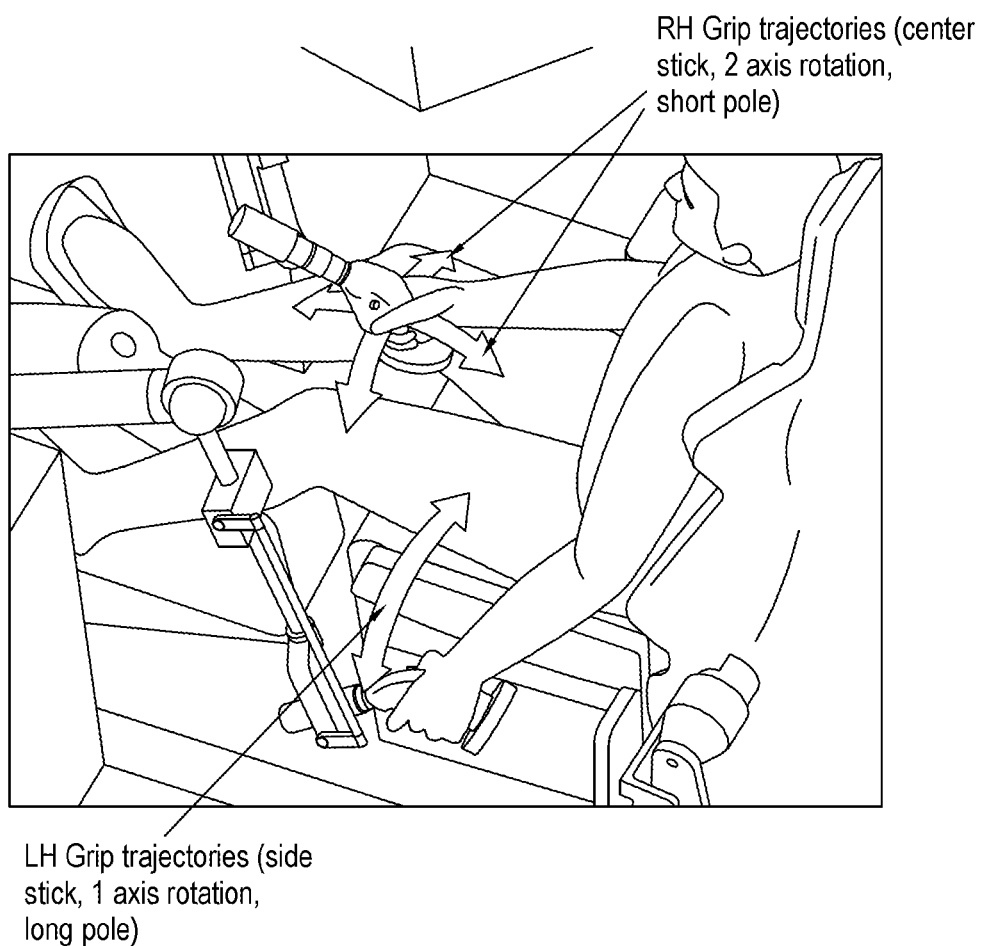
FIG. 3 shows the system of FIG. 1 in use for simulating another possible pilot controls layout.

FIG. 3 shows and alternative layout providing one control in the form of a central stick between the pilot's legs and a side stick—this time as a long pole control. Again, the pilot will try the controls with the initial settings, provide feedback and the settings will be adjusted until the ideal settings are found.

The use of a VR headset for the pilot to experience the flight simulation can be preferred if the pilot might otherwise be distracted or perceive the controls differently if he can see the robotic arms. With the VR headset, the pilot is more immersed in the flight scenario.

Using the system of this disclosure, different iterations of the controls design can be tested easily and quickly without the need to repeatedly physically create new mock-ups of the controls for iterative testing, which is costly and time-intensive. The system of this disclosure will lead to a cockpit controls design that is closer to the pilot's ideal in a shorter time (perhaps a matter of hours or days as opposed to months or even years) and at lower cost.

What is claimed is:

1. A system for simulating pilot controls for use in determining an optimal layout of pilot controls in a cockpit, the system, comprising:
   one or more computer controlled robotic arms arranged to be mounted in a cockpit environment and having a plurality of ranges of motion and trajectories and configured to receive a control member for operation by a pilot, the arms being movable to position the control member received therein in different positions relative to the pilot; and
   a computer configured to send commands to the one or more computer controlled arms to control position and/or movement of the arm(s) and to control force feedback based on position, trajectory and force parameters, to position the control member in a first position, the computer further configured to receive feedback from the pilot and to adjust the parameters and generate updated commands to cause the arms to move the control member to a second position based on the feedback.

2. The system of claim 1, further comprising:
   a flight simulator display and means for providing feedback of position and/or movement of the one or more computer controlled arms to the flight simulator display.

3. The system of claim 2, wherein the flight simulator display comprises a screen.

4. The system of claim 2, wherein the flight simulator display comprises a virtual reality headset.

5. The system of claim 1, wherein the control member comprises a handle.

6. The system of claim 1, wherein the control member comprises a pedal.

7. A cockpit simulator comprising:
   a pilot seat and a system for simulating pilot controls as claimed in claim 1;
   wherein the one or more computer controlled arms are located relative to the pilot seat such that the control grip, when mounted on the one are more computer controlled arms can be held and moved by a pilot when seated in the pilot seat.

8. The cockpit simulator of claim 7, wherein the one or more computer controlled arms are located in front of the pilot seat.

9. The cockpit simulator of claim 7, wherein the one or more computer controlled arms are located above the pilot seat.

10. The cockpit simulator of claim 7, wherein the one or more computer controlled arms are located behind the pilot seat.

\* \* \* \* \*